United States Patent [19]

Winchell et al.

[11] 3,981,769

[45] Sept. 21, 1976

[54] PROCESS FOR PREPARING FLUORINE-18

[75] Inventors: Harry S. Winchell, Lafayette; Dale K. Wells, Martinez; James F. Lamb, Albany; Samuel B. Beaudry, Walnut Creek, all of Calif.

[73] Assignee: Medi-Physics, Inc., Emeryville, Calif.

[22] Filed: Aug. 29, 1974

[21] Appl. No.: 501,557

Related U.S. Application Data

[63] Continuation-in-part of Ser. No. 247,588, April 26, 1972, abandoned.

[52] U.S. Cl..................................... 176/11; 176/14
[51] Int. Cl.$^2$.......................................... G21G 1/00
[58] Field of Search ................................ 176/10–16

[56] References Cited

OTHER PUBLICATIONS

Physical Review, vol. 136, No. 2B, Oct. 26, 1964, pp. B399–B404, by Matous et al.

*Primary Examiner*—Harvey E. Behrend
*Attorney, Agent, or Firm*—Samuel L. Welt; Bernard S. Leon; R. Hain Swope

[57] ABSTRACT

An improved process for preparation of fluorine-18 by a neon (deuteron, alpha particle) fluorine-18 nuclear reaction in a non-reactive enclosed reaction zone wherein a ultrapure product is recovered by heating the reaction zone to a high temperature and removing the product with an inert gas.

7 Claims, 1 Drawing Figure

PROCESS FOR PREPARING FLUORINE-18

This application is a continuation-in-part of Ser. No. 247,588, filed Apr. 26, 1972, now abandoned.

BACKGROUND OF THE INVENTION

The preparation of the radionuclide fluorine-18 is known in the art. Of the various methods known in the art whereby fluorine-18 can be formed, the neon-20 (deuteron, alpha particle) is preferred. In this reaction, a quantity of neon-20 gas molecules enclosed within a reaction zone is irradiated with energetic deuteron particles to form the radionuclide fluorine-18 and alpha particles as reaction products. This reaction also produces a number of radiocontaminants, principally $^{22}Na$ which is produced by the reactions $^{21}Ne\,(d,n)^{22}Na$ and $^{22}Ne\,(d,2n)^{22}Na$. Obviously, when utilizing other gases, e.g. oxygen, to prepare fluorine-18 corresponding radiocontaminants are produced. Further, deuterons and secondary neutrons react with the metal foil cover and internal walls of the cyclotron target to form additional contaminants. For example, wherein the target is lined with nickel, the reactions $^{60}Ni\,(d,n)^{61}Ni\,(d,2n)^{64}Cu$ take place as well as the formation of shorterlived radioisotopes of copper and neutron activation products of the nickel itself. These radiocontaminants adhere to the walls of the reaction vessel as does the desired fluorine-18. The problem therefore has been how best to recover fluorine-18 in an ultrapure form.

One method of recovering fluorine-18 produced under the above-described conditions has been to disassemble the reactor and wash the product from the interior walls of the reaction chamber. This method suffers two disadvantages, i.e. the washing also removes the radiocontaminants which must then be separated chemically or physically from the product and the separation and washing operations entail exposure of personnel to radioactivity.

A second method for recovery of fluorine-18 from a reaction chamber such as described herein is by the use of a carrier gas. The most common such gases are fluorine, hydrogen fluoride and nitrous oxide. These gases undergo a reaction in the vessel and are taken out as $^{18}F-F_2$, $H^{18}F$ and $NO^{18}F$, respectively. The use of such gases is characterized by somewhat lower yields than other ways of recovering $^{18}F$. More important is the problem of the scavenger or carrier gas itself, i.e. how to handle and dispose of it after the product has been removed, particularly in the instance of HF and $F_2$ wherein there is a toxicity problem.

In accordance with the present invention, a method has been discovered whereby fluorine-18 can be recovered from a reaction vessel in ultrapure form with substantially no radiocontaminants utilizing a carrier free system and with a minimum potential exposure of personnel to radioactivity.

DETAILED DESCRIPTION OF THE INVENTION

Figure 1:
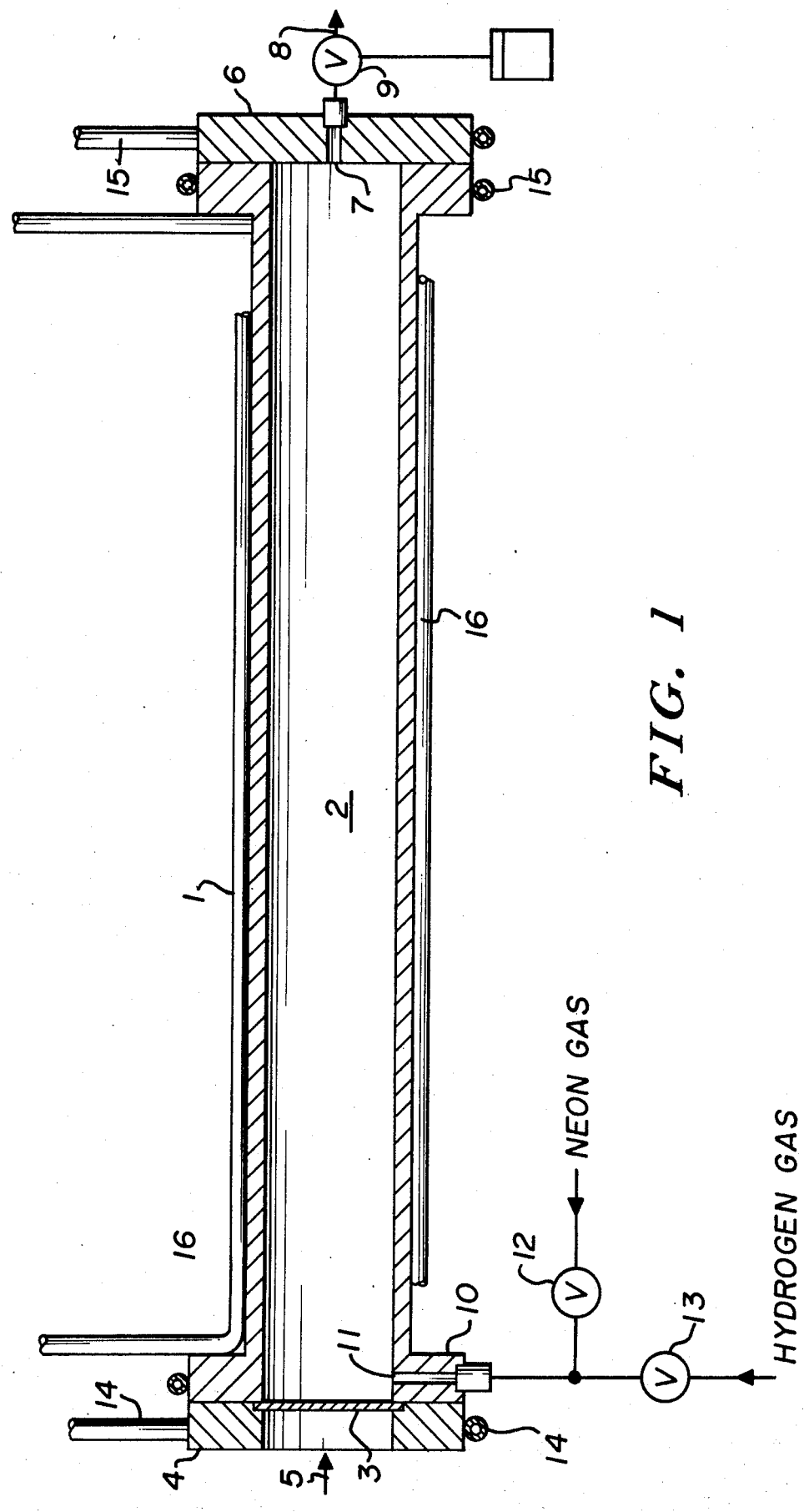

In accordance with the present invention, the radionuclide fluorine-18 is produced by the irradiation of neon-20 in a suitable reaction chamber and subsequently heating the product to high temperature and removing it with an inert gas.

FIG. 1 is a schematic cross-sectional view of apparatus suitable for the practice of the subject invention.

Such apparatus comprises an elongated tubular reaction chamber 1 defining an enclosed reaction zone 2 with flanged ends. The reaction chamber is lined with a suitable non-reactive metal such as, for example, nickel, a nickel-cobalt alloy such as available under the trademark Havar from the Hamilton Watch Co. and the like. The target window 3 which closes one end of the reaction chamber is secured by clamp ring 4. The target window is cooled by a jet of cooling gas such as air or helium by conventional apparatus not shown. A beam of energetic deuterons flows through the target window in the direction of arrow 5 from a cyclotron not shown. A cover plate 6 lined with the same material as the reaction tube closes the end of the reaction chamber opposite the target window. The gaseous reaction products are removed in an effluent gas stream through said cover plate through a port 7. Port 7 communicates with subsequent collecting or processing equipment, not shown, through conduit 8. The flow of effluent gas, for example, hydrogen is controlled by remotely operated air valve means 9 which also opens and closes port 7 to conduit 8.

The flange 10 at the target end of the reaction chamber 1 has an inlet port 11 through which neon-20 gas is introduced into the reaction zone by means of valve 12 and inert flushing gas such as, for example, dry hydrogen, nitrogen and the like is introduced through valve 13. Heating means such as calrod or Nichrome wire heating elements 14, 15 and 16 overlie the exterior of the reaction chamber thereby providing means to heat the contents of the reaction chamber to facilitate the removal of fluorine-18 in accordance with the present invention. In a preferred apparatus in accordance with the present invention, the reaction chamber is nickel and is about one meter long and about two inches in internal diameter with a ¼ inch wall thickness. The target window is a metallic foil made from nickel or a nickel-cobalt alloy such as Havar and from about ½ to 1 mil thick.

In accordance with the present invention, after irradiation of neon-20 for the requisite time and at the energy level selected for the reaction, the reaction zone and the fluorine-18 radionuclide contained therein are heated to high temperatures, i.e., temperatures in excess of about 500°C. While there is no upper temperature limit for the heating step, it is preferred to heat the reaction vessel to a temperature between about 500°C. and about 1000°C., preferably between about 700°C. and about 900°C. This heating step is believed to break the van derWaals forces between the fluorine-18 and the surface of the reaction chamber. The fluorine-18 may then be removed by flushing the reaction vessel with a suitable inert dry gas. The radiocontaminants produced by the irradiation, principally $Na^{22}$, by virtue of being solids are not separated from the reaction chamber walls by the heating operation and therefore are not removed by the inert gas.

In accordance with the method of the present invention, fluorine-18 is recovered in high yield with an absolute minimum of potential exposure of personnel to radioactivity. The yields of fluorine-18 realized in accordance with the method of the invention are in excess of 90% and the level of the principal radiocontaminant i.e. $Na^{22}$ in the product has been shown to be $10^{-6}\%$. The product is of such high quality that it may be directly utilized to label pharmaceuticals.

The gas utilized to remove fluorine-18 from the reaction chamber is accordance with the present invention can be any non-flourine containing gas which is inert to fluorine-18. Examples of suitable gases include hydrogen, nitrogen and helium. Of these hydrogen is preferred.

The following examples further illustrate the invention.

EXAMPLE 1

Neon-20 gas was introduced into the reaction chamber of apparatus such as illustrated in FIG. 1 at ambient temperature and a pressure within the range of 20–50 psig. Irradiation of the neon gas with deuterons at an energy level of 12–14 MeV for 60 minutes at 25 microamperes produced about 400–500 mCi of fluorine-18. The reaction chamber and contents were then heated to about 700°C and dry hydrogen gas was introduced into the chamber at the rate of 2 liters per minute at 2.5 psig. The yield of fluorine-18 was 16.3 mCi per microampere hour. The product was ultrapure and contained substantially no radiocontaminants.

The above procedure was repeated utilizing helium as the inert gas with a yield of 15.4 mCi fluorine-18 and with nitrogen as the inert gas with a yield of 12.0 mCi fluorine-18. The above yields are all considered good.

EXAMPLE 2

Utilizing the procedure discribed in Example 1, Neon-20 was bombarded with a 50 microampere stream of deuterons for 15 minutes (12–14 MeV deuterons). Dry hydrogen gas at 2.5 psig was flowed through the reactor for 15 minutes at ambient temperature (20°C.) The gas was collected in standard collection bottles and assayed for fluorine-18. The temperature of the reaction chamber was raised to 200°C. and dry hydrogen gas again passed through the reaction chamber for 15 minutes. The collected gas was assayed. This procedure was repeated at 100° intervals through 700°C.. The results are expressed in the following Table wherein the amount of activity recovered is expressed as a percent of that present in the reactor at the termination of bombardment.

Table

| Temperature Degrees Centigrade | Percent Activity Recovered |
|---|---|
| 20° | 0 |
| 200° | 0 |
| 300° | 0.1 |
| 400° | 36.6 |
| 500° | 50.0 |
| 600° | 9.9 |
| 700° | 3.4 |

We claim:
1. A process for making fluorine-18 comprising: irradiating neon-20 gas molecules in an enclosed reaction zone with energetic deuteron particles to form fluorine-18; heating said reaction zone to a temperature in excess of 500°C.; and flushing the heated fluorine-18 from said reaction zone with an inert gas.
2. The process of claim 1 wherein said reaction chamber is lined with nickel metal.
3. The process of claim 1 wherein said temperature is between about 700°C. and about 900°C..
4. The process of claim 1 wherein said inert gas is selected from the group consisting of hydrogen, nitrogen and helium.
5. The process of claim 4 wherein said gas is hydrogen.
6. The process of claim 4 wherein said gas is nitrogen.
7. The process of claim 4 wherein said gas is helium.

* * * * *